United States Patent [19]
Sage

[11] Patent Number: 6,008,546
[45] Date of Patent: Dec. 28, 1999

[54] ELECTRONIC CONTROL SYSTEM AND COLLISION AVOIDANCE SYSTEM FOR AN ELECTRIC CART

[75] Inventor: William L. Sage, Rogers, Ark.

[73] Assignee: Assembled Products Corporation, Rogers, Ark.

[21] Appl. No.: 08/848,997

[22] Filed: May 2, 1997

[51] Int. Cl.$^6$ .................................................. G08G 1/16
[52] U.S. Cl. ........................... 307/9.1; 318/580; 318/587; 340/435; 701/301
[58] Field of Search ..................................... 307/10.1, 9.1; 318/139, 580, 587; 340/901, 903, 435; 180/167, 168; 342/71; 367/904; 701/93, 301

[56] References Cited

U.S. PATENT DOCUMENTS

| | | |
|---|---|---|
| 4,020,916 | 5/1977 | Noble . |
| 4,379,497 | 4/1983 | Hainsworth et al. .................... 318/587 |
| 4,471,276 | 9/1984 | Cudlitz . |
| 4,641,136 | 2/1987 | Kowalczyk .............................. 340/435 |
| 4,771,840 | 9/1988 | Keller ........................................ 180/11 |
| 4,825,500 | 5/1989 | Basham et al. ........................... 15/314 |
| 5,053,768 | 10/1991 | Dix ........................................... 180/167 |
| 5,064,012 | 11/1991 | Losego .................................... 180/19.1 |
| 5,119,286 | 6/1992 | Huss et al. .............................. 363/147 |
| 5,343,974 | 9/1994 | Rabek ...................................... 180/216 |
| 5,345,471 | 9/1994 | McEwan .................................. 375/200 |
| 5,361,070 | 11/1994 | McEwan .................................... 342/21 |
| 5,414,792 | 5/1995 | Shorey ...................................... 388/811 |
| 5,463,595 | 10/1995 | Rodhall et al. ........................... 367/93 |
| 5,646,612 | 7/1997 | Byon ........................................ 701/301 |

FOREIGN PATENT DOCUMENTS

4317228  5/1993  Germany .

*Primary Examiner*—Albert W. Paladini
*Attorney, Agent, or Firm*—Boyd D. Cox

[57] ABSTRACT

An electronic control system including a collision avoidance system is for use on an electric cart, such as used for shopping, wherein the electronic control system includes a databus board for expanding user options on the electric cart. The collision avoidance system includes sensors which detect the presence of objects in the path of the moving cart and the system acts to stop the cart when the objects are detected. Additional user options of the electronic control system are an anti-theft system for deterring cart theft and vandalism and a voice module for playing recorded messages to the cart operator.

29 Claims, 9 Drawing Sheets

ELECTRONIC CONTROL SYSTEM AND COLLISION AVOIDANCE SYSTEM FOR AN ELECTRIC CART

BACKGROUND

The present invention is directed to an electronic control system for expanding user options on an electric shopping cart, which options include a collision avoidance system, an anti-theft system, and a voice actuation system for use with the electronic control system on the cart.

Increasingly, electric carts are being provided in stores, malls and other public facilities for use by individuals having impaired mobility. By using electric carts, shoppers and patrons who are unable to walk or stand for any duration of time are allowed to move about independently.

Electric carts can be difficult to maneuver in small spaces, such as the aisles of a store, especially if the operator is inexperienced and unfamiliar with the cart. Consequently, shopping displays and other structures are vulnerable targets for moving carts. Collisions involving these carts can result in property damage, not only to merchandise, fixtures and building structures, but also to the cart itself. Moreover, the risk of personal injury to the cart operator and other customers cannot be ignored with this potential for accidents.

In addition, the carts can be driven away from unauthorized areas where they can be more easily vandalized or stolen. The loss of a cart or damage to a cart can result in a sizable financial loss to the owner.

For the foregoing reasons there is a need for an electronic control system having the capacity to readily expand user options on an electric cart wherein the selective options include a collision avoidance system that reduces the risk of cart collisions and can include an anti-theft system which discourages the removal of carts from the authorized area of use.

SUMMARY

The present invention is directed to an electronic control system for use on an electric cart that satisfies the need of easily expanding the user's options available on the cart which include a system for assisting the driver to avoid collisions with objects and a system for discouraging removal of the cart from an authorized area of use in order to deter theft and vandalism.

In a preferred embodiment of the invention, the electronic control system includes a databus board which provides an interface between user option function modules and the cart functions. The user option function modules are modular components which enable the user to easily expand the function of his electric cart by plugging the selected modules and components into the databus board as the functions are wanted or needed.

A first preferred user option function module included in the electronic control system is a power supply/low voltage shutdown module. This module converts a 12 volt direct current to a five volt direct current to enable the control systems which require a five volt direct current to operate. The module further protects the cart's battery. It monitors the charge on the battery. When the charge falls below a selected level, the module disables the motor until the battery is recharged to an acceptable level.

A collision avoidance module is a second user option function module which comprises part of the driver assisted avoidance system. The system automatically stops the cart when the cart is about to hit an object in its path. The system also includes a pair of ultrasonic sensors disposed on the cart's front and rear. The sensors detect objects with which the cart is likely to collide.

A third user option function module includes an anti-theft module comprised by the anti-theft system which reduces the risk of cart theft. The system further includes a radio transmitter which is positioned at an exit of the authorized cart area. When the cart gets within range of the radio transmitter, a radio receiver on the cart will detect the signal from the radio transmitter. The receiver notifies the anti-theft module that the cart is near the exit and the module acts to stop the cart.

A fourth user option function module is the electronic voice module which can be activated by the cart functions or any of the other modules in the electronic control system. The voice module includes a voice chip for storing a plurality of voice messages which can be played when prompted.

It is an object of the present invention to provide an electric cart with an electronic control system having expandable user options that can be selectively added or removed.

It is a further object of the present invention to provide an electronic control system having an expandable user option function that can be installed on an existing electric cart.

It is a further object of the present invention to provide an electric cart with a collision avoidance system which automatically stops the cart when an object is detected in the path of the moving cart to avoid hitting the object.

It is a further object of the present invention to provide an electronic control system on an electric shopping cart that includes modular component systems which can be separately replaced in the control system, if necessary.

It is a further object of the present invention to provide an expandable electronic control system where the user options can be easily added by plugging the selected modular components into the databus board.

It is a further object of the present invention to provide an electronic control system that can be readily expanded as needed by the cart owner.

It is a further object of the present invention to provide an electronic control system having a databus board that enables the user option function modules to be plugged into the board to interface with each other and to interface with the cart functions.

It is a further object of the present invention to provide an electronic control system with a user option comprising an anti-theft system.

It is a further object of the present invention to provide an expandable electronic control system with a user option comprising an electronic voice module having a plurality of stored messages for selective playback.

BRIEF DESCRIPTION OF DRAWINGS

Reference is made to the accompanying drawings in which are shown illustrative embodiments of the invention and from which novel features and advantages will be apparent.

DETAILED DESCRIPTION

A preferred embodiment of the present invention is for use with an electric cart adapted to be driven by an operator and commonly used for pedestrian activities. Generally, such carts have a reversible motor powered by a direct current from a 12 volt battery, although the voltage of the battery can vary. The reversible motor moves the cart in a forward direction or in a reverse direction. A throttle enables the operator to select the speed of the cart, while a steering mechanism enables him to maneuver the cart.

Figure 1:
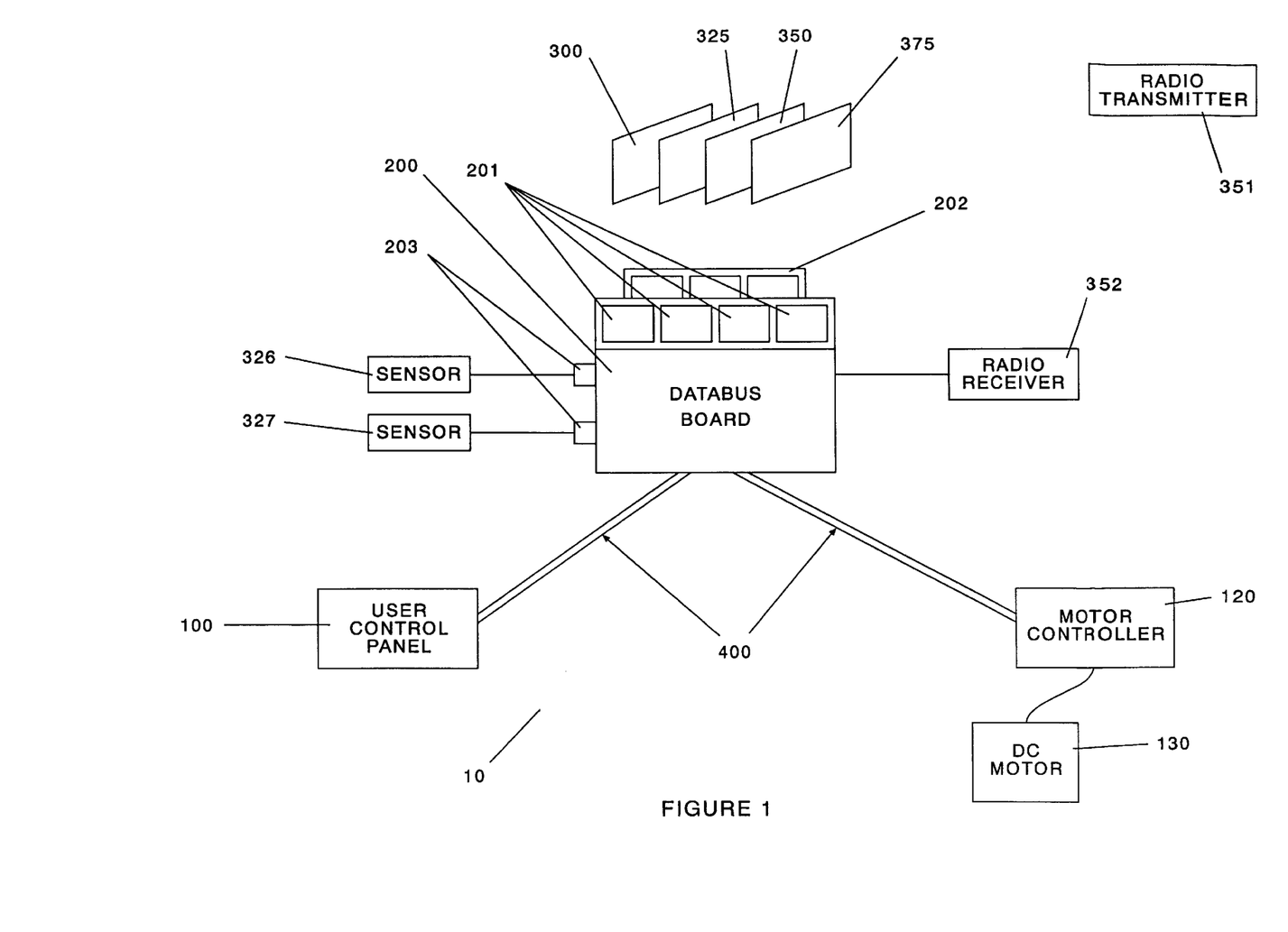
FIG. 1 is schematic diagram of the electronic control system.

Referring to the drawings wherein like characters designate corresponding parts throughout the views and referring particularly to FIG. 1, there is shown the electronic control system (10) of the present invention.

The electronic control system (10) comprises a user control panel (100), a databus board (200), a motor controller (120) and a plurality of user option function modules (300,325,350,375). The control system (10) also includes modular components comprising a pair of sensors (326,327), a radio transmitter (351) and a radio receiver (352).

Figure 2:
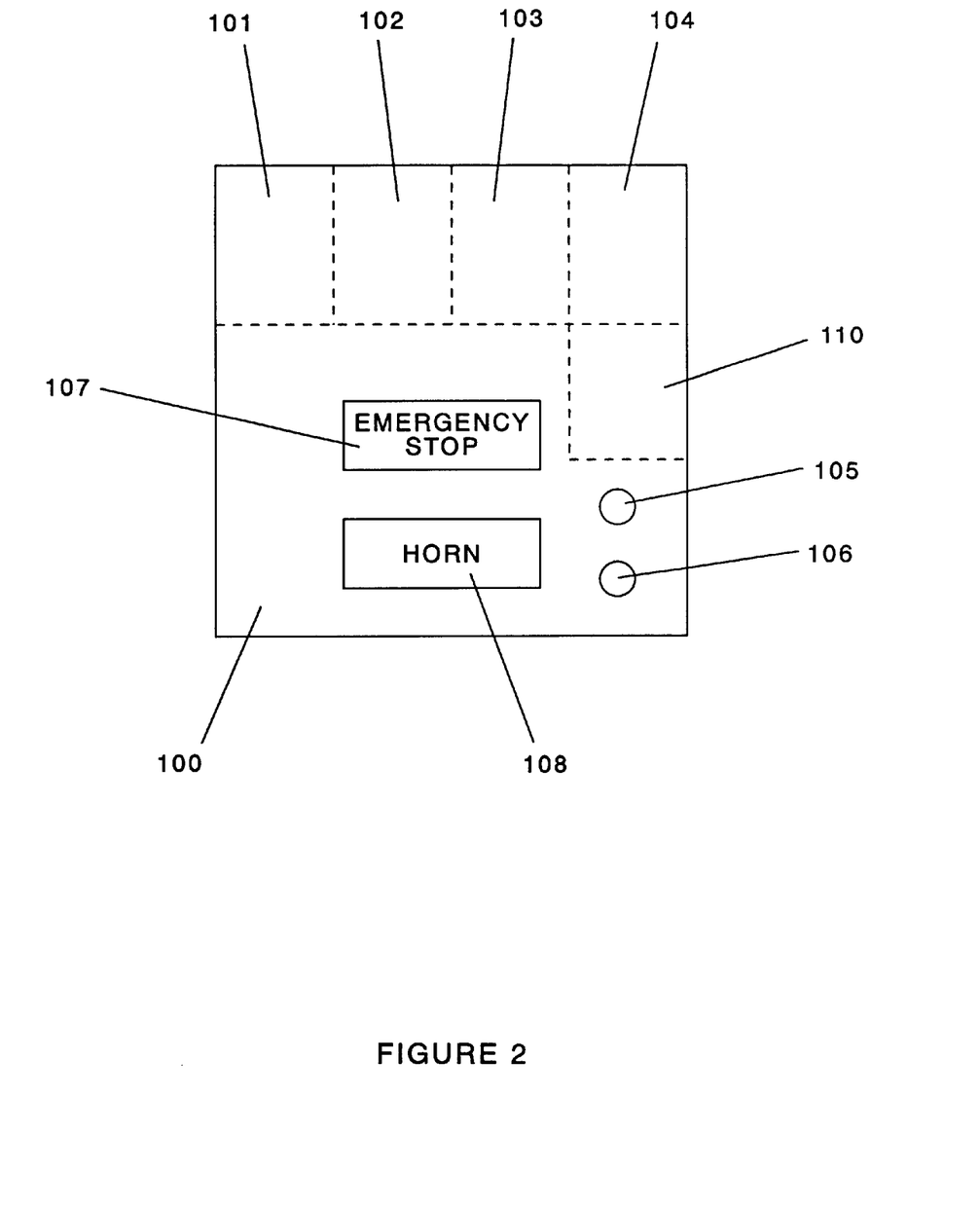
FIG. 2 is a diagram of the user control panel.

The user control panel (100) as shown schematically in FIG. 2 comprises an electronic circuit board with four logic circuits including a forward circuit (101), a reverse circuit (102), a neutral circuit (103) and an emergency stop circuit (104). A reverse indicator light (105) and a forward indicator light (106) are on the user control panel (100). In addition, the user control panel has an emergency stop button (107) and a horn button (108). A bar graph display (not shown) is disposed on the control panel (100). The control panel (100) further comprises a variable resistor (110) for regulating the speed of the motor and cart.

Figure 3:
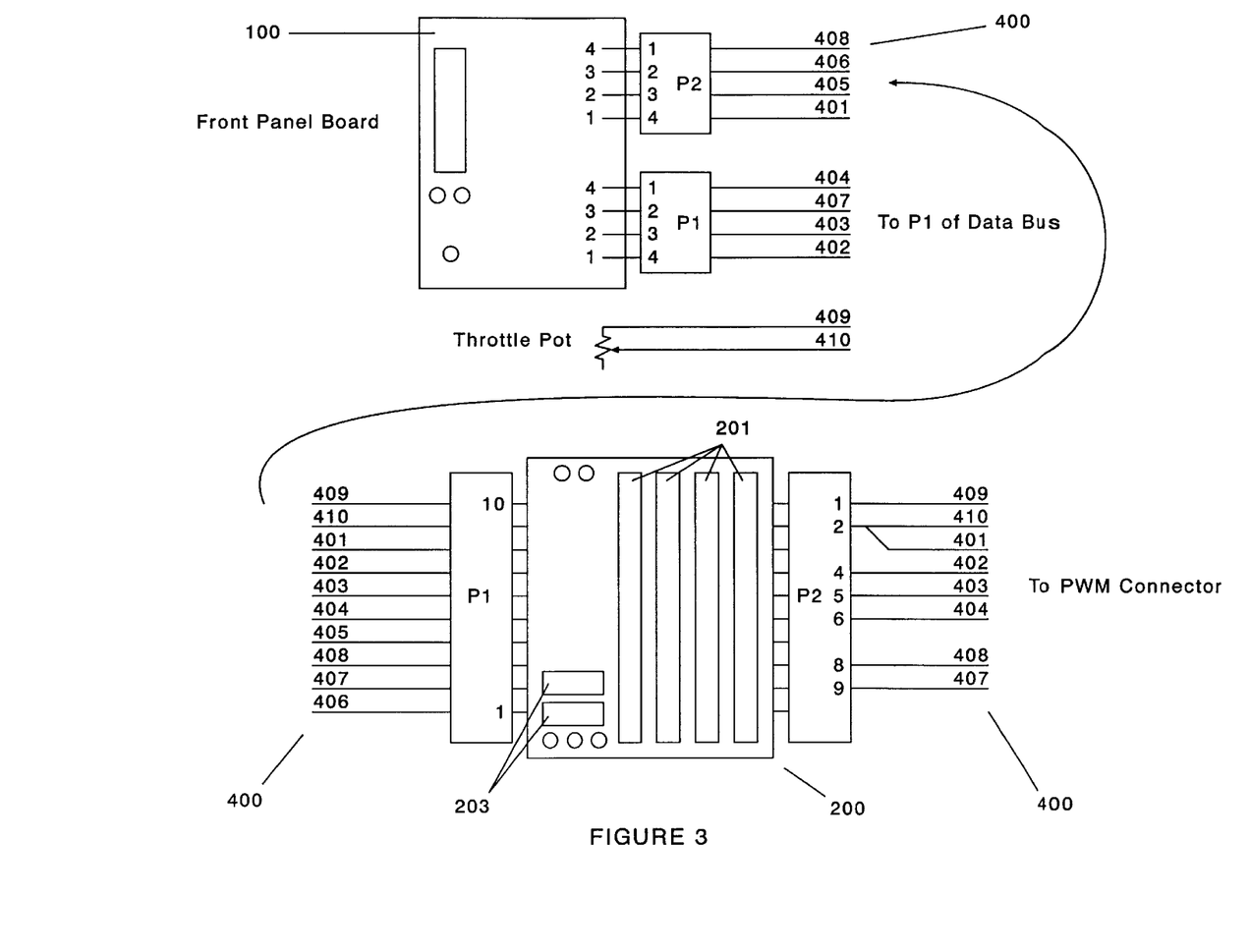
FIG. 3 is a diagram of the databus board.
Figure 4:
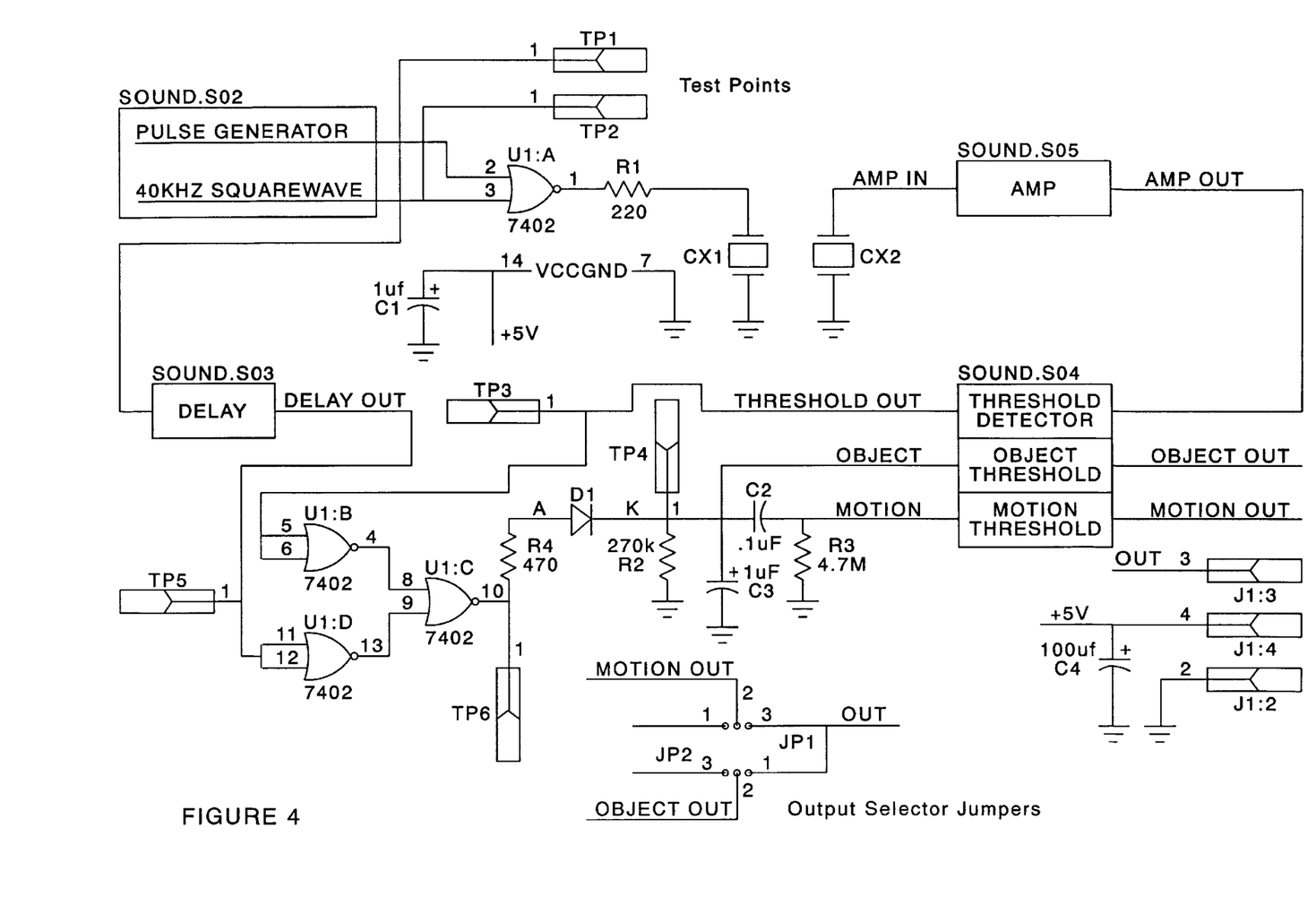
FIG. 4 is a circuit diagram of the collision avoidance module circuit board.
Figure 5:
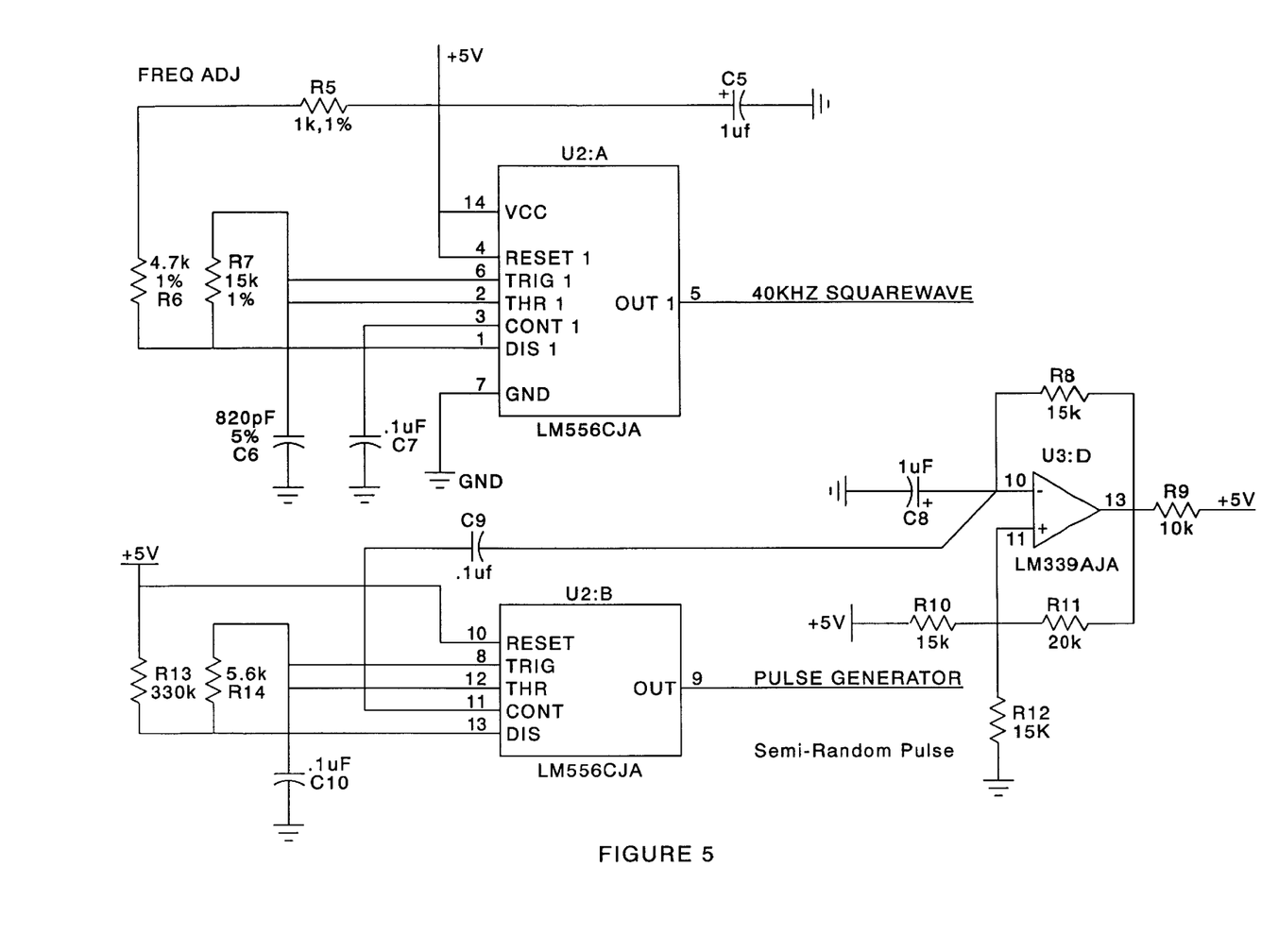
FIG. 5 is a circuit diagram of S02 from the collision avoidance module circuit board in FIG. 4.
Figure 6:
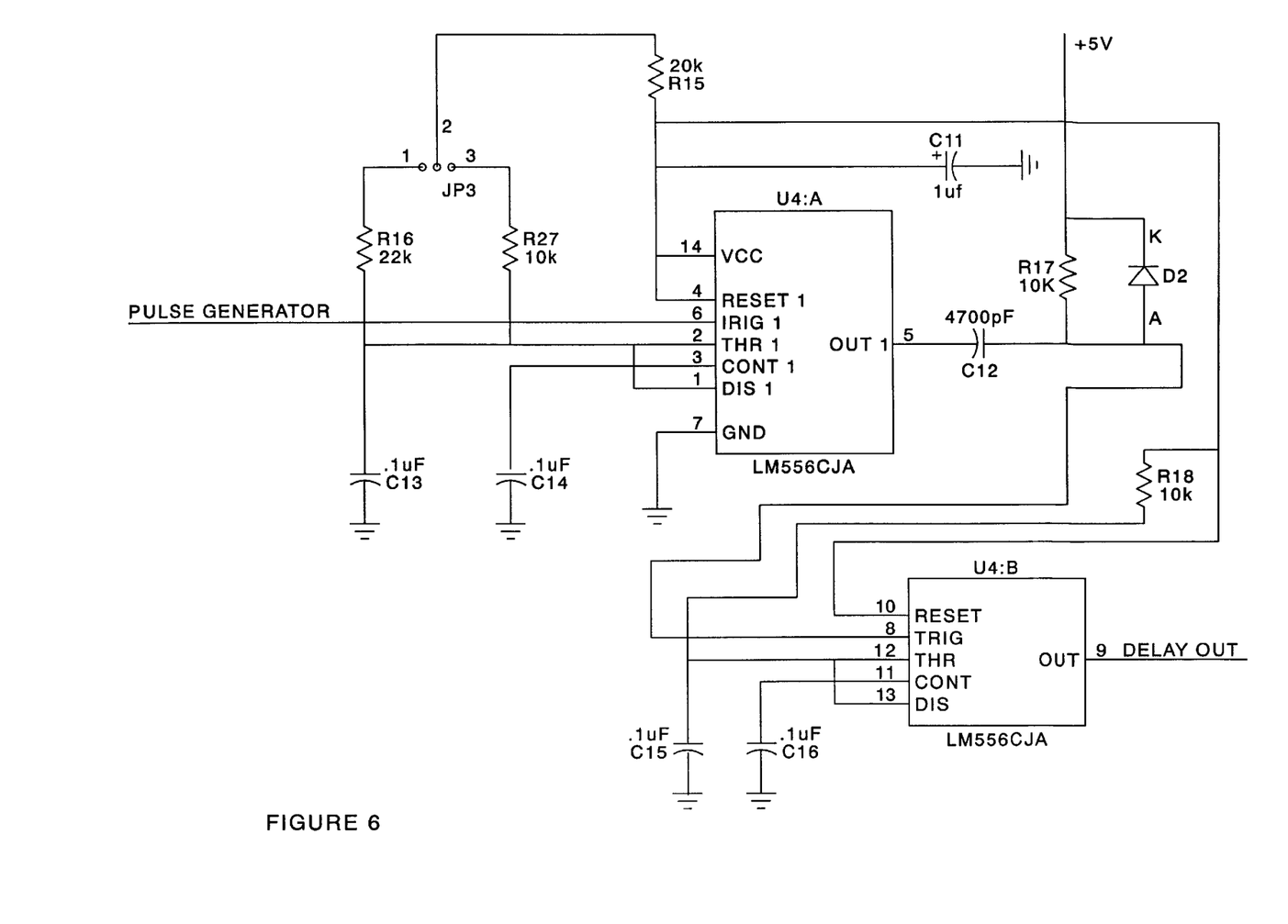
FIG. 6 is a circuit diagram of the delay shown at S03 in FIG. 4.
Figure 7:
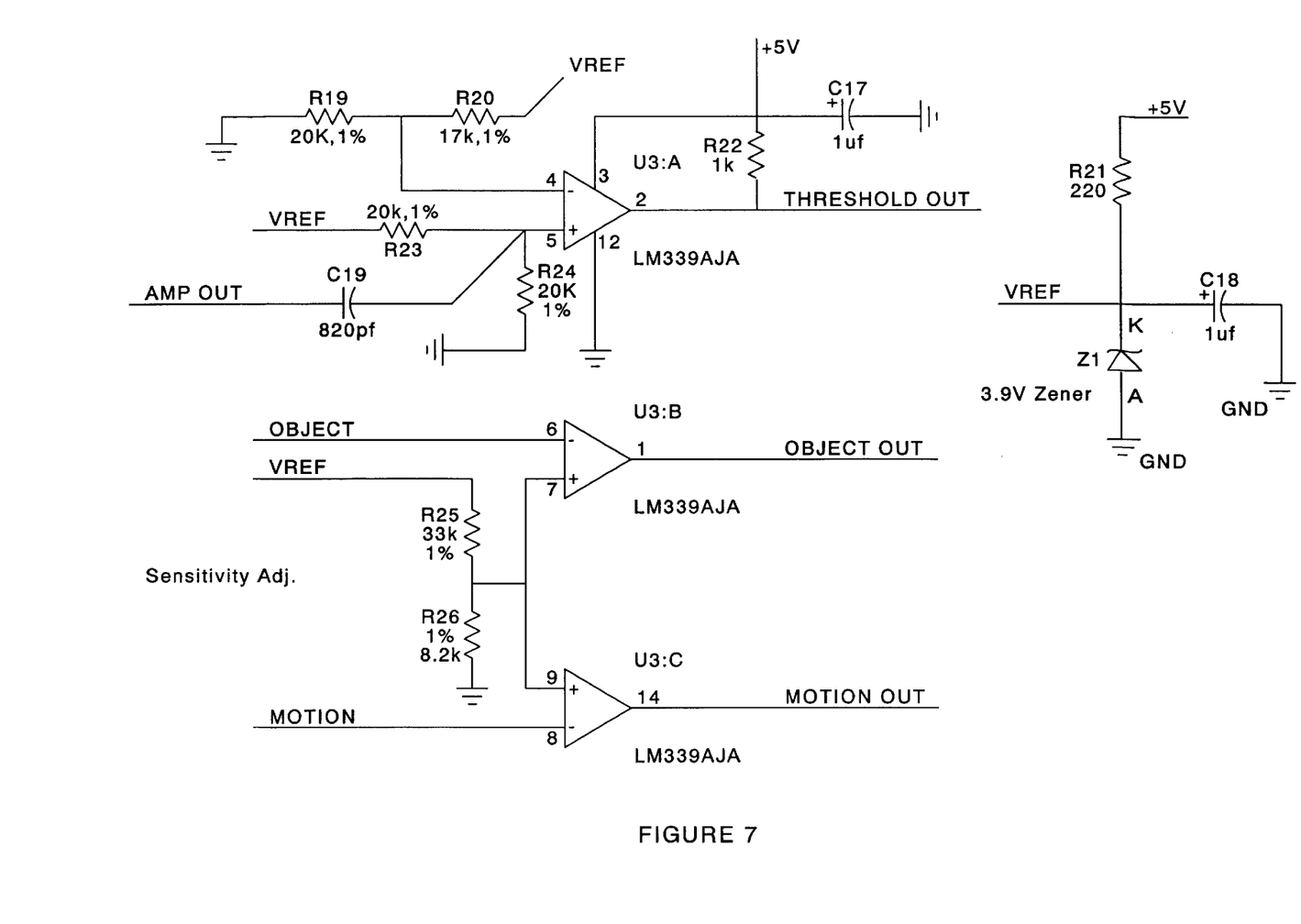
FIG. 7 is a circuit diagram of the threshold detectors shown at SO4 in FIG. 4.
Figure 8:
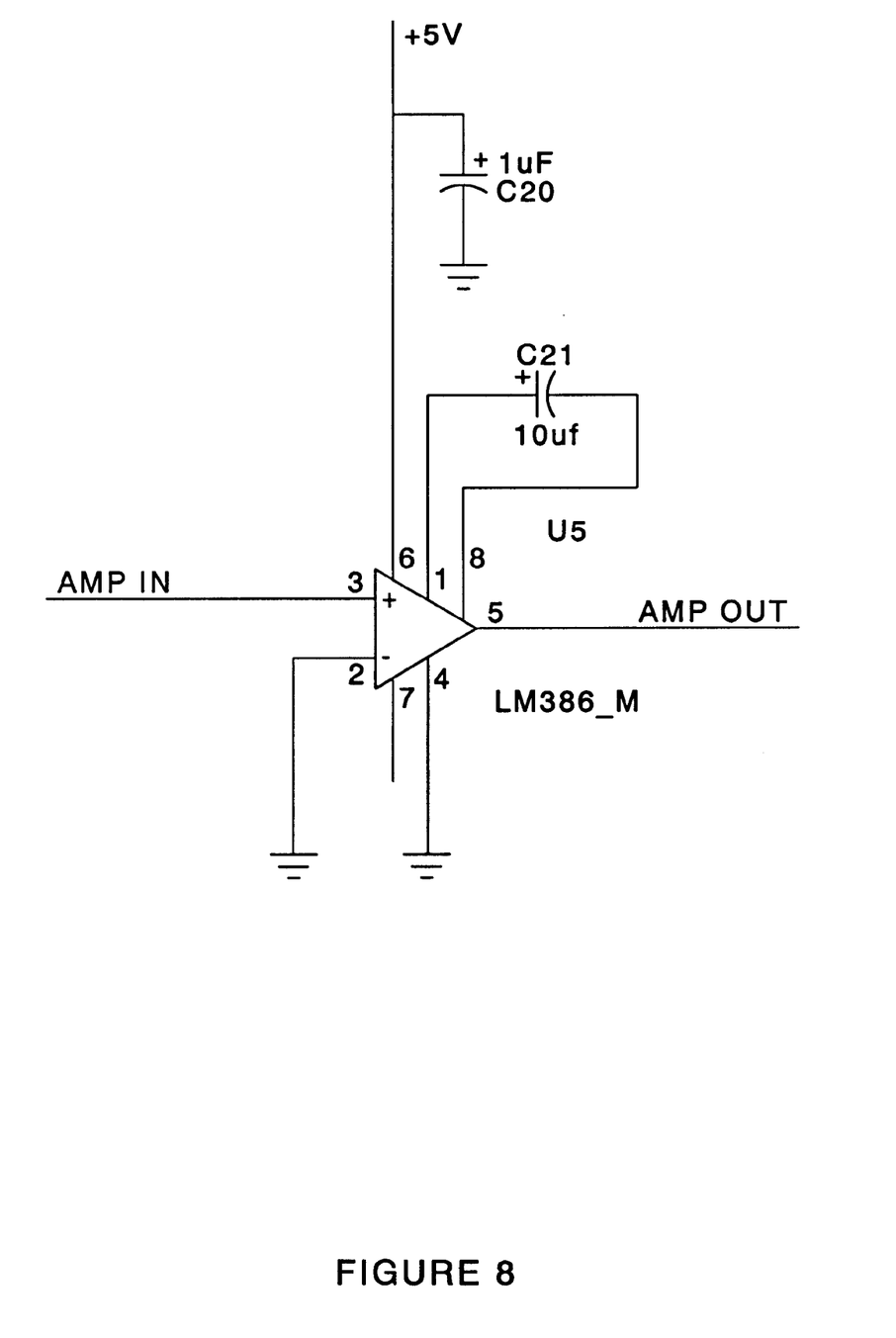
FIG. 8 is a circuit diagram of the amplifier shown at S05 in FIG. 4.
Figure 9:
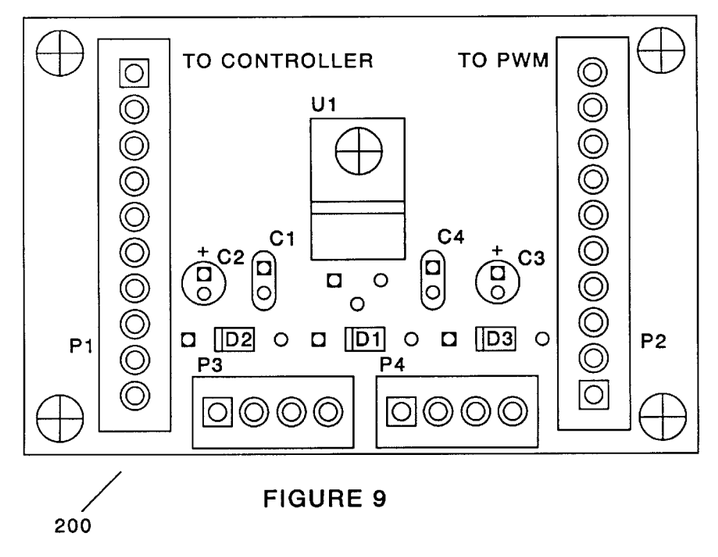
FIG. 9 is a schematic diagram of the databus board.

The databus board (200) is an interface having a plurality of card connectors (201). FIGS. 1 and 3 show the databus board (200) to comprise four card connectors (201). The databus board (200) is not limited to four card connectors, but could have any number of card connectors depending on a user's requirements. Interconnecting the four card connectors (201) in FIG. 1 are a plurality of databus data lines (202). FIG. 9 shows, for example, a schematic diagram of the databus board (200).

In a preferred embodiment as in FIG. 1, the motor controller (120) comprises a pulse width modulator using solid-state electronics, but any known direct current motor controller could be used instead of a pulse width modulator.

The user option function modules include a power supply/low voltage shutdown module (300) comprising a first circuit board, a collision avoidance module (325) comprising a second circuit board, an anti-theft module (350) comprising a third circuit board and an electronic voice module (375) comprising a fourth circuit board. The electronic voice module (375) includes a voice chip and a speaker.

The collision avoidance module (325) and the pair of sensors (326,327) are the components comprising the collision avoidance system. The anti-theft module (350), the radio receiver (352) and the radio transmitter(s) (351) are components of the anti-theft system.

A cable (400) extends from the user control panel (100) and is connected with the databus board (200) as shown in FIG. 1. The cable (400) shown again in FIG. 3, comprises a plurality of transmission lines including a throttle line (T) (401), an emergency switch stop output line (SS)(402), a reverse switch output line (RS)(403), a forward switch output line (FS)(404), a neutral switch output line (NS) (405), a horn line (H)(406), a motor reverse command line (MR) (407), a motor forward command line (MF)(408), a throttle pot wiper line (TPW)(409) and a throttle pot low line (TPL)(410). All of the transmission lines, except for the throttle pot wiper line and the throttle pot low line have two states: a low voltage level which is an active state and a high voltage level which is an inactive state. The low voltage level is about zero volts and the high voltage state is about five volts up to about 12 volts.

The user control panel (100) provides an operator interface which allows the operator to select the cart operation functions. The cart operation functions are required to drive the cart and include forward, reverse and neutral. The four logic circuits on the electronic circuit board of the control panel implement the cart operation functions as they are selected by the operator.

A first logic circuit on the electronic circuit board is the forward circuit (101) which activates a vehicle forward condition and illuminates the forward indicator light (106). In the vehicle forward condition, the cart will move in the forward direction when the throttle is engaged. The second logic circuit is the reverse circuit (102) which activates the vehicle reverse condition and illuminates the reverse indicator light (105). When the cart is in the vehicle reverse condition and the throttle is engaged, the cart moves in the reverse direction. The third logic circuit is the neutral circuit (103). This circuit (103) activates the vehicle neutral condition which puts the cart into neutral and ultimately stops the cart's motor (130) in FIG. 1.

Neither the vehicle forward condition, the vehicle reverse condition nor the vehicle neutral condition can be activated while the cart is moving. They can only be activated when the cart is in a stopped position. Therefore, the cart must be stopped before any of these three cart operation functions can be selected. The cart can be stopped by releasing the throttle or by pressing the emergency stop button (107) on the user control panel (100).

The fourth logic circuit is the emergency stop circuit (104). This circuit (104) activates the vehicle neutral condition and puts the cart into neutral, regardless of the position of the throttle. Consequently, the emergency stop circuit (104) will stop the motor (130) even when the cart is moving. The emergency stop circuit (104) can be activated by depressing the emergency stop button (107) on the control panel (100).

The horn button (108) on the control panel (100) sounds a horn when pressed. The horn can alternately be activated by the electronic circuit board of the user control panel (100) when the cart is moving in the reverse direction. The collision avoidance module (325) can include circuitry to activate the horn when an object is detected in front of or behind the cart. However, to sound the horn when an object is detected behind the cart is not an option, if the user control panel circuit board is designed to honk the horn when the cart is moving in the reverse direction.

The user control panel (100) can include a bar graph display (not shown) that indicates the charge level of the cart's battery. Such a display can provide useful information to the operator, including whether or not the battery needs to be charged.

The operator selects a cart speed by manipulating the throttle on the cart to particular positions. For example, in a twist-type throttle, the throttle is positioned by a twisting motion imparted by the user. In response to the position of the throttle, the variable resistor (110) communicates the selected speed to the motor controller (120). The motor controller (120) shown in FIG. 1 drives the direct current motor (130) of the cart.

The variable resistor (110) comprises a throttle potentiometer, but other known devices which are used to control the speed of a direct current motor could be used instead, such as a Hall Effect transducer or a photoelectric device.

The motor controller (120) controls the speed of the motor (130) based on the position of the variable resistor (110) which reflects the operator's selected speed. The motor controller (120) further controls the direction of the motor (130) based on the operator's selected cart function. When the operator selects reverse, the voltage level of the motor reverse command line (407) is pulled low, commanding the motor (130) to move in reverse. The motor controller (120) runs the motor (130) in reverse. Conversely, when the operator selects forward, the voltage level of the motor forward command line (408) is pulled low and the motor controller (120) runs the motor (130) forward.

The throttle line (401) is an output of the motor controller (120) which informs the databus board (200) that the cart's motor (130) is being commanded to move. The motor controller (120) pulls the throttle line (401) low when current is being applied to run the motor (130) in either direction.

The information that the motor (130) has been commanded to move is available to the modules plugged into the databus board (200). It is important that the user control panel know from the databus board (200) when the cart is moving, and thereby prevent the operator from selecting another operation function.

It is also important that the collision avoidance module (325) know the direction in which the motor (130) is running to know in which direction the cart is moving. The motor controller (120) provides this information to the databus board. Based upon this information, the module (325) activates a selected sensor. For example, when the cart is moving forward, the first sensor (326) on the front of the cart is activated. This ensures that only objects in front of the cart will be detected when the cart is moving in the forward direction. An object near the rear of the cart when it is moving forward will not be detected.

When the motor (130) is not being commanded to move, the motor controller (120) shorts out the motor (130), thereby stopping the cart. As a result, any time the cart goes into neutral, as for example, when the operator selects the vehicle neutral condition, or when the emergency stop button (107) is depressed on the control panel (100), the motor (130) is no longer being commanded to move and the motor (130) stops. Consequently, the motor controller (120) can act as an effective brake to stop the cart.

The databus board (200) comprises four card connectors (201) as shown in FIGS. 1 and 3 for selectively receiving the user option function modules. The connectors (201) of the present invention each comprise an edge-card connector, but any type of known connector can be used to plug the modules into the databus board (200). Databus data lines (202) interconnect the edge-card connectors (201) so that the modules plugged into the databus board (200) can communicate with each other.

The databus board (200) provides an interface between the modules and the data transmission lines (401–410). Therefore, any information received by the databus board (200) is available to any of the modules plugged into the edge-card connectors (201). Signals from the sensors (326, 327) are received by the databus board (200) and communicated to the collision avoidance module (325). Signals from the radio receiver (352) that are sent to the databus board (200) are relayed to the anti-theft module (350).

The user option function modules can control the cart functions through the data transmission lines (401–410). For example, by pulling the voltage level low in the emergency stop switch output transmission line (402), the collision avoidance module (325) can stop the cart.

Most of the electronic components in the electronic control system require a 5 volt current. The power supply/low voltage shutdown module (300) comprises a circuit board having circuitry to convert the 12 volt direct current from the cart's battery to a 5 volt direct current, thereby making the voltage from the battery available to any electronic circuit board on the cart.

The power supply/low voltage shutdown module (300) is modular and can be selectively plugged into or removed from the databus board (200) like the other three user option function modules. In a preferred embodiment of the control system, such a power supply module is essential operate the electric cart.

The power supply/low voltage shutdown module (300) also monitors the charge on the cart's power supply battery. When the charge on the battery falls below a selected acceptable level, the module (300) stops the cart by pulling the voltage level low in the emergency stop line (402). The cart is not allowed to operate until a proper voltage level in the battery is detected by the module (300). The power supply/low voltage shutdown module (300) protects the battery from damage which can result from using the cart when the battery is not adequately charged.

The collision avoidance module (325) is part of the driver assisted avoidance system which keeps the electric cart from hitting objects that are in the cart's travel path. The system detects the objects and stops the cart to avoid any collision therebetween. The collision avoidance module (325) comprises a circuit board. An example of the circuitry in a preferred embodiment of the circuit board of the collision avoidance module (325) is shown in FIGS. 4–8.

Figure 10:
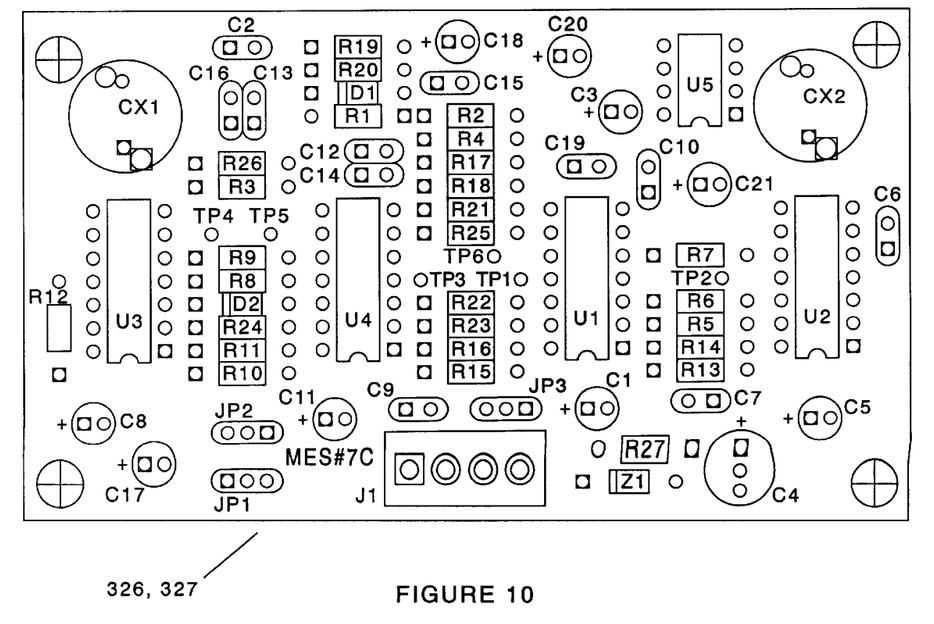
FIG. 10 is a schematic diagram of the ultrasonic sensor circuit board.

The driver assisted avoidance system further comprises the pair of sensors (326,327). The sensors include a first sensor (326) which is mounted on the front of the cart and a second sensor (327) which is mounted on the rear of the cart. In a preferred embodiment, each of the sensors is an ultrasonic sensor, but other types of sensors known in the art could be used instead. An example of an ultrasonic sensor that can be used is shown in FIG. 10.

The first sensor (326) is gated to detect objects within a first distance of about three feet from the front of the cart. The second sensor (327) is gated to detect objects within a second distance of about two feet from the rear of the cart. Each of the first and second distances can be adjusted to larger or smaller values as required by the user. As for example, both the first and second distances could be decreased were the cart being used in a store having narrow aisles.

The anti-theft system deters removal of the electric cart from an authorized use area by stopping the cart when it nears an exit to the area. The anti-theft module (350) is a circuit board that is selectively plugged into the databus board when the system is installed. The radio receiver (352) is positioned on the cart, while the radio transmitter (351) is placed at an exit of the designated use area, as for example, the exit to the store, mall or parking lot. More than one radio transmitter can be used in an anti-theft system, as for example, when there is more than one exit from the authorized use area.

The radio transmitter (351) operates at a specific radio frequency sending out signals comprising a serial digital code. The radio receiver (352) is on the cart and is connected with the databus board (200). The receiver (352) has an adjustable serial decoder which is set to the same digital code as the radio transmitter (351). Therefore, the radio receiver (352) will respond to signals from its own transmitter, but not to stray radio signals. When the radio receiver (352) detects signals from the radio transmitter (351), the anti-theft module (350) acts to automatically stop the cart.

Each radio transmitter (351) can optionally include a key switch for turning the transmitter (351) on and off. Thus, the radio transmitter (351) can be activated by authorized personnel when use is required and inactivated at other times.

The voice module (375) is an optional module on the databus board (200) comprising a circuit board that has a solid-state voice chip and a speaker. Messages can be saved on the solid-state voice chip. The messages can be prerecorded or recorded by the store employees. The module (375) is activated to play selected messages through the speaker. The voice module (375) can be activated to play selected messages by any of the other modules plugged into the databus board (200). For example, when one of the sensors detects an object, the collision avoidance module (325) can activate the voice module (375) to play a selected message through the speaker. The message can notify the operator that the cart has stopped due to an obstacle in the its path and give instruction on how the operator can proceed, although any preferred recorded message can be used.

Another example is when the anti-theft module (350) is activated by its close proximity to the radio transmitter (351), the anti-theft module (350) can activate the voice module (375) to play a message warning the operator that the cart is close to an unauthorized area. The recorded messages are not limited in context or content as set forth herein, but can be activated by any of the modules and can convey any desired message to the cart operator.

FIG. 3 shows the data transmission lines (401–410) to be connected with the databus board (200). Eight of the data transmission lines extend between the user control panel (100) and the motor controller (120). These eight data transmission lines include the throttle line (401), the emergency switch stop output line (402), the reverse switch output line (403), the forward switch output line (404), the motor reverse command line (407), the motor forward command line (408), the throttle pot wiper line (409) and the throttle pot low line (410). The horn line (406) and the neutral switch output line (405) extend between the user control panel (100) to the databus board (200).

The selected user option function modules are plugged into the edge-card connectors (201) on the databus board (200). The data transmission lines (401–410) are connected to the databus board (200). The databus data lines (202) interconnect the edge-card connectors (201). Thus, the databus board (200) enables not only communication among the modules themselves, but also between the modules and the data transmission lines.

The sensors (326,327), as shown in FIGS. 1 and 3 are connected to the databus board (200) by electrical connectors (203) for communication with the collision avoidance module (325). The electrical connectors (203) comprise "quick" connectors, but any type of electrical connectors known in the art could be used instead to connect the sensors to the databus board (200).

The radio receiver (352) is disposed on the cart and connects to the databus board (200) for communication with the anti-theft module (350). The radio transmitter (351) is positioned remote from the cart, preferably adjacent an egress to the authorized cart use area, such as a store, mall, or parking lot exit.

The driver assisted avoidance system functions as follows. When the cart is in the vehicle forward condition and the throttle is engaged, the first sensor (326) on the front of the cart is activated and the cart moves forward. When the front of the cart gets within the first distance from an object, the first sensor (326) detects the object. The first sensor (326) then sends a signal that an obstruction is in front of the cart. The signal goes to the databus board (200) where it is conveyed to the collision avoidance module (325). The module (325) pulls the voltage level low in the emergency stop output line (402) which puts the cart into neutral. When the cart is in neutral, no moving command is being sent to the motor (130). It is known that the motor controller (120) shorts out the motor (130) when there is no command to move, so the motor (130) is shorted out and the cart is stopped.

The second sensor (327) is not activated to detect objects when the cart is moving forward, so that an object close to the rear of the cart will not be detected and subsequently affect the movement of the cart.

When the cart is in the vehicle reverse condition and the throttle is engaged by the operator, the second sensor on the rear of the cart is activated and the cart moves in reverse. As the cart moves in the reverse direction, the second sensor (327) will detect an object within the second distance from the cart's rear. When such an object is detected, the second sensor (327) signals the collision avoidance module (325) via the databus board (200). The module (325) responds by pulling the voltage level low in the emergency switch stop output line (402) to stop the cart. The first sensor (326) is inactive when the cart is moving in the reverse direction. Therefore, objects close to the front of the cart will not be detected and subsequently stop the cart.

When an object has been detected by either the first (326) or second (327) sensor, the collision avoidance module (325) can signal the voice board module (375), via the databus data lines (202), to play a recorded voice message. Optionally, the collision avoidance module (325) can also signal the horn data line (406) to sound the horn.

To operate the anti-theft system of the present invention, the radio transmitter (351) is turned on using the key switch. The transmitter (351) begins sending its serial digit coded signals. When the cart and the radio receiver (352) move into the transmitter's range, e.g. near an exit, the radio receiver (352) picks up the signals. The radio receiver (352) signals the databus board (200) and the anti-theft module (350). The module (350) pulls the voltage level low in the emergency stop data line (402) which puts the cart into neutral. It is known that when the cart is in neutral, the motor (130) is shorted out and the cart assumes a stopped position. With the motor shorted out, it is difficult for the cart to be pushed any farther. This reduces the likelihood of the cart being completely removed from the authorized area, such as the store. As long as the cart remains on the premises, there is also less chance of the cart being vandalized.

In one example of the preferred embodiment of the electronic control system being installed on an electric cart, the user control panel is mounted on top of the steering column on the front of the cart, although it could be positioned anywhere on the cart that is easily accessible to the operator when driving the cart. Preferably, the cart's throttle is disposed on a selected grip of a handle bar steering mechanism attached to the cart. The throttle can also be located at any point which is easily accessible to an operator seated in the cart. The databus board (200) is preferably mounted under the rear cover of the cart.

The first sensor (326) is mounted on the front cover of the electric cart in order to detect objects located in front of the cart. The second sensor (327) is mounted on a rear cover of the shopping cart to detect objects to the rear of the cart.

To drive the cart, the operator selects forward or reverse from the user control panel (100) and then engages the throttle. The cart will move in the designated direction. The amount of twist imparted to the throttle determines the speed of the cart. To stop the cart, the operator can release the throttle or press the emergency stop button (107).

The foregoing example is given for illustrative purposes only. The installation configuration of the electronic control system can vary depending on the design of the electric cart and the user requirements.

The electronic control system of the present invention provides a system comprised of modular components for expanding user options on an electric cart as the options are needed. One of the options is a driver assisted avoidance system which aids the driver in safely maneuvering the cart in a store or other area without hitting objects that may be in the cart's path. Another option is the anti-theft system that not only deters theft of the cart, but also reduces the risk of cart vandalism. Useable with both the driver assisted avoidance system and the anti-theft system, the voice module can play selected messages when prompted.

Although the present invention has been described in considerable detail with reference to certain preferred versions thereof, other versions are possible. Therefore, the spirit and scope of the appended claims should not be limited to the description of the preferred versions contained herein.

I claim:

1. An electronic control system for expanding user functions on a motorized vehicle, said electronic control system comprising:
   a user control panel for operating the vehicle;
   a databus board having a plurality of connectors for selective engagement with user option function modules;
   a motor controller;
   at least one sensor for detecting an object in the pathway of the moving vehicle; and
   a plurality of user option function modules engaged with the connectors, wherein said modules include at least:
      a power supply module for supplying power to the electronic control system; and
      a collision avoidance module for stopping the vehicle when an object is detected in the pathway of the moving vehicle.

2. The electronic control system of claim 1, further comprising an anti-theft system comprising:
   a radio transmitter remote from the cart for sending signals to a radio receiver,
   a radio receiver on the cart for receiving the signals from the transmitter when said cart enters within the range of the radio transmitter, and
   an anti-theft module for stopping the motor of the cart when the radio receiver detects a signal from the radio transmitter.

3. The electronic control system of claim 1, wherein said user option function modules further include a voice module for storing a plurality of voice messages.

4. The electronic control system of claim 1, wherein said motorized vehicle is a cart which moves in at least a forward direction and a reverse direction, said cart having a front end and a rear end, wherein said at least one sensor comprises:
   a first sensor for detecting objects within a first distance from the front end of the cart, and
   a second sensor for detecting objects within a second distance from the rear end of the cart, wherein the first sensor is selectively activated when the cart is moving in a forward direction and the second sensor is activated when the cart is moving in a reverse direction;
   wherein to avoid collision with an object when the cart is moving in the forward direction, the first sensor is activated and upon detecting an object within the first distance from the front end of the cart, the first sensor signals the collision avoidance module which acts to stop the cart;
   wherein to avoid collision with an object when the cart is moving in the reverse direction, the second sensor is activated and upon detecting an object within the second distance from the rear end of the cart, the second sensor signals the collision avoidance module which acts to stop the cart.

5. The electronic control system of claim 2, wherein said first sensor is an ultrasonic sensor and said second sensor is an ultrasonic sensor.

6. The electronic control system of claim 4, wherein said user control panel further comprises a circuit board having a plurality of logic circuits including a forward circuit, a reverse circuit, a neutral circuit and an emergency stop circuit.

7. The electronic control system of claim 6, further comprising a plurality of transmission lines interconnecting the user control panel, the databus board and the motor controller.

8. The electronic control system of claim 7, further comprising a plurality of databus data lines interconnecting the connectors on the databus board.

9. The electronic control system of claim 8, wherein said power supply module further comprising circuitry for converting an approximate 12 volt direct current to an approximate five volt direct current.

10. The electronic control system of claim 9 wherein,
    the circuit board of the user control panel further comprises:
       a vehicle forward condition to move the cart in a forward direction and which is activated by said forward circuit on the circuit board of the user control panel,
       a vehicle reverse condition to move the cart in a reverse direction and which is activated by said reverse circuit on the circuit board of the user control panel,
       a vehicle neutral condition to stop the cart and which is activated by said neutral circuit or said emergency stop circuit on the circuit board of the user control panel.

11. The electronic control system of claim 10, wherein said user control panel further comprises an emergency stop button for activating said emergency stop circuit.

12. The electronic control system of claim 11, wherein said data transmission lines include:
(i) throttle line extending between the control panel and the motor controller;
(ii) emergency switch stop output line extending between the control panel and the motor controller;
(iii) reverse switch output line extending between the control panel and the motor controller;
(iv) forward switch output line extending between the control panel and the pulse width modulator;
(v) neutral switch output line extending between the control panel and the databus board;
(vi) horn line extending between the control panel and the databus board;
(vii) motor reverse command line extending between the control panel and the databus board;
(viii) motor forward command line extending between the control panel and the databus board;
(ix) throttle pot wiper line extending between the control panel and the databus board; and
(x) throttle pot low line extending between the control panel and the databus board;
wherein when the cart is not being commanded to move in the forward or reverse direction, the motor is shorted out by said motor controller and the cart assumes a stopped position.

13. The electronic control system of claim 12, wherein the user control panel further comprises:
a forward indicator light which is illuminated when the vehicle forward condition is activated, and
a reverse indicator light which is illuminated when the vehicle reverse condition is activated.

14. The electronic control system of claim 13, wherein the circuit board of the power supply module further comprises circuitry for detecting when a charge on the battery falls below a selected level and stopping the cart when the charge is below the selected level.

15. The electronic control system of claim 14, further comprising an anti-theft system comprising:
a radio transmitter remote from the cart for sending signals to a radio receiver,
a radio receiver on the cart for receiving the signals from the transmitter when said cart enters within the range of the radio transmitter, and
an anti-theft module for stopping the motor of the cart when the radio receiver detects a signal from the radio transmitter.

16. The electronic control system of claim 15, wherein said user option function modules further include a voice module for storing a plurality of voice messages.

17. A driver assisted avoidance system for use on a motorized vehicle which moves in at least a forward direction and a reverse direction, wherein the system comprises:
a first sensor for detecting an object within a first distance from a front of the vehicle;
a second sensor for detecting an object within a second distance from a rear of the vehicle; and
a means for activating the first and second sensor to detect an object and for stopping the vehicle when the first or the second sensor detects an object;
wherein the first sensor is selectively activated when the vehicle is moving in a forward direction and the second sensor is selectively activated when the vehicle is moving in a reverse direction.

18. The system of claim 17, wherein the first sensor is not activated when the cart is moving in the reverse direction and the second sensor is not activated when the cart is moving in the forward direction.

19. The system of claim 17, wherein the first and second sensors comprise ultrasonic sensors.

20. The system of claim 17, wherein the means for stopping the cart is a collision avoidance module comprising a circuit board.

21. The driver assisted avoidance system of claim 17, wherein the motorized vehicle is an electric cart having a motor and a control system for controlling the motor which includes a databus board for interfacing with at least one user option function module,
wherein said means for activating and stopping is a user option function module which comprises a collision avoidance module;
wherein when the first sensor detects an object, the first sensor signals the collision avoidance module that an object has been detected within a first distance of the front of the cart and said module engages the control system to stop the cart;
wherein when the second sensor detects an object, the first sensor signals the collision avoidance module that an object has been detected within a second distance from the rear of the cart and said module engages the control system to stop the cart.

22. The driver assisted avoidance system of claim 21, wherein said first sensor comprises an ultrasonic sensor and the second sensor comprises an ultrasonic sensor.

23. The driver assisted avoidance system of claim 22, wherein said collision avoidance module comprises a circuit board.

24. The driver assisted avoidance system of claim 23, wherein the first sensor is not activated to detect an object when the cart is moving in the reverse direction and the second sensor is not activated to detect an object when the cart is moving in the forward direction.

25. An electronic control system for expanding user functions on a motorized vehicle, said electronic control system comprising:
a user control panel for operating the vehicle;
a databus board having a plurality of connectors for selective engagement with user option function modules;
a motor controller;
at least one sensor for detecting an object in the pathway of the moving vehicle; and
a plurality of user option function modules engaged with the connectors, wherein said modules include at least:
a power supply module for supplying power to the electronic control system; and
a collision avoidance module for stopping the vehicle when an object is detected in the pathway of the moving vehicle;
wherein said user control panel further comprises a circuit board having a plurality of logic circuits including a forward circuit, a reverse circuit, a neutral circuit and an emergency stop circuit; and
wherein said control panel further comprises an emergency stop button for activating said emergency stop circuit.

26. The electronic control system of claim 25, wherein said motorized vehicle is a cart which moves in at least a forward direction and a reverse direction, said cart having a front end and a rear end, wherein said at least one sensor comprises:

a first sensor for detecting objects within a first distance from the front end of the cart; and a second sensor for detecting objects within a second distance from the rear end of the cart, wherein the first sensor is selectively activated when the cart is moving in a forward direction and the second sensor is selectively activated when the cart is moving in a reverse direction;

wherein to avoid collision with an object when the cart is moving in the forward direction, the first sensor is activated and upon detecting an object within the first distance from the front end of the cart, the first sensor signals the collision avoidance module which acts to stop the cart; and wherein to avoid collision with an object when the cart is moving in the reverse direction, the second sensor is activated and upon detecting an object within the second distance from the rear end of the cart, the second sensor signals the collision avoidance module which acts to stop the cart.

27. The electronic control system of claim 26, further comprising a plurality of transmission lines interconnecting the user control panel, the databus board and the motor controller.

28. The electronic control system of claim 27, further comprising a plurality of databus data lines interconnecting the connectors on the databus board.

29. The electronic control system of claim 28, wherein said power supply module further comprises circuitry for converting an approximate 12 volt direct current to an approximate five volt direct current.

* * * * *